(12) United States Patent
Chakra et al.

(10) Patent No.: US 11,301,289 B2
(45) Date of Patent: Apr. 12, 2022

(54) COGNITIVE MONITORING OF DATA COLLECTION IN REAL TIME

(71) Applicant: International Business Machines Corporation, Armonk, NY (US)

(72) Inventors: Al Chakra, Apex, NC (US); Tian Ming Pan, Beijing (CN); Peng Fei Tian, Beijing (CN); Bo Chen Z Zhu, Xi'an (CN); Chu Yun Cloud Tony, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 704 days.

(21) Appl. No.: 16/138,294

(22) Filed: Sep. 21, 2018

(65) Prior Publication Data
US 2020/0097319 A1 Mar. 26, 2020

(51) Int. Cl.
G06F 9/46 (2006.01)
G06F 16/23 (2019.01)

(52) U.S. Cl.
CPC .......... *G06F 9/466* (2013.01); *G06F 16/2379* (2019.01)

(58) Field of Classification Search
CPC .............. G06F 9/46; G06F 16/23; G06F 9/50
See application file for complete search history.

(56) References Cited

U.S. PATENT DOCUMENTS

| 2004/0230530 | A1  | 11/2004 | Searl et al. |
| 2006/0243798 | A1* | 11/2006 | Kundu ............... G06Q 20/4016 235/383 |
| 2008/0183618 | A1* | 7/2008  | Giacco .................. G06Q 40/02 705/40 |
| 2008/0191007 | A1* | 8/2008  | Keay ...................... G06Q 40/02 235/379 |

(Continued)

FOREIGN PATENT DOCUMENTS

CN 106156027 A 11/2016

OTHER PUBLICATIONS

Gyoo-cheol Lee et al.; Advanced Science and Technology Letters vol. 106 (Information Technology and Computer Science 2015), pp. 5-8 http://dx.doi.org/10.14257/ast.2015.106.02; "A Study on Detection and Rules for Establishing Abnormal Financial Transaction Detection System in Securities Business Circles"; Dated: 2015; Retrieved: Sep. 19, 2018; 4 pages.

(Continued)

*Primary Examiner* — Tarek Chbouki
*Assistant Examiner* — Maher N Algibhah
(74) *Attorney, Agent, or Firm* — Cantor Colburn LLP; Teddi Maranzano

(57) ABSTRACT

According to one or more embodiments of the present invention a computer-implemented method includes receiving a transaction-data for a transaction that occurs in a particular time-interval. The method further includes comparing a set of parameters from the transaction-data with a performance profile associated with the particular time- (Continued)

interval. The method further includes based on determining that the transaction is a deviant transaction, forwarding the transaction-data to a first data collector. The method further includes based on determining that the transaction is a conventional transaction, forwarding the transaction-data to a second data collector.

11 Claims, 7 Drawing Sheets

(56) References Cited

U.S. PATENT DOCUMENTS

| | | | | |
|---|---|---|---|---|
| 2008/0306711 | A1* | 12/2008 | Bansal | G06F 11/3419 702/182 |
| 2009/0288165 | A1* | 11/2009 | Qiu | H04L 63/14 726/23 |
| 2012/0284211 | A1* | 11/2012 | Datta | G06F 11/0751 706/11 |
| 2015/0254650 | A1* | 9/2015 | Bondesen | G06Q 20/3674 705/67 |
| 2016/0148213 | A1* | 5/2016 | Sirai | G06Q 20/20 705/44 |
| 2017/0126532 | A1* | 5/2017 | Bansal | H04L 41/142 |
| 2017/0148096 | A1 | 5/2017 | Dodson | |
| 2017/0308909 | A1* | 10/2017 | Faith | G06K 9/00315 |
| 2017/0316506 | A1 | 11/2017 | Lesner et al. | |
| 2018/0084227 | A1* | 3/2018 | Migdal | G06Q 20/20 |
| 2019/0122492 | A1* | 4/2019 | Nguyen | G07F 17/3248 |
| 2020/0073940 | A1* | 3/2020 | Grosset | G06Q 40/12 |

OTHER PUBLICATIONS

Tang Jun et al.; https://ieeexplore.ieee.org/document/6092626/; "Feature Extraction in Abnormal Pattern Recognition of Financial Transaction—Abstract"; Dated: Nov. 5-6, 2011; Retrieved: Sep. 19, 2018; 1 page.

* cited by examiner

COGNITIVE MONITORING OF DATA COLLECTION IN REAL TIME

BACKGROUND

The present invention relates to computing technology, and particularly a cloud computing system to optimize data collection for online transactions by cognitive monitoring and adjusting of the data collection in real time.

The growth of systems integration and inter-company networking in recent years has been accompanied by an increasing requirement for intelligent approaches to the monitoring of operational data. For example, where a number of different enterprises or departments within an enterprise rely on a specific service provider, the service provider may need to charge the different users according to their usage or to allocate resources between different users. This requires monitoring of one or more usage metrics such as CPU cycles or other resources used, or the number of data items or bytes processed. Secondly, the ever-increasing need for consistently high performance of data processing systems necessitates efficient performance monitoring and analysis.

SUMMARY

According to one or more embodiments of the present invention a computer-implemented method includes receiving a transaction-data for a transaction that occurs in a particular time-interval. The method further includes comparing a set of parameters from the transaction-data with a performance profile associated with the particular time-interval. The method further includes based on determining that the transaction is a deviant transaction, forwarding the transaction-data to a first data collector. The method further includes based on determining that the transaction is a conventional transaction, forwarding the transaction-data to a second data collector.

According to one or more embodiments of the present invention a system includes a transaction system, and a data collection system to acquire transaction-data for a plurality of transactions being performed by the transaction system. Acquiring the transaction-data includes receiving a transaction-data for a transaction that occurs in a particular time-interval. Acquiring the transaction-data further includes comparing a set of parameters from the transaction-data with a performance profile associated with the particular time-interval. Acquiring the transaction-data further includes based on determining that the transaction is a deviant transaction, forwarding the transaction-data to a first data collector. Acquiring the transaction-data further includes based on determining that the transaction is a conventional transaction, forwarding the transaction-data to a second data collector.

According to one or more embodiments of the present invention, a computer program product includes a computer readable storage medium having stored thereon program instructions executable by one or more processing devices to perform a method that includes receiving a transaction-data for a transaction that occurs in a particular time-interval. The method further includes comparing a set of parameters from the transaction-data with a performance profile associated with the particular time-interval. The method further includes based on determining that the transaction is a deviant transaction, forwarding the transaction-data to a first data collector. The method further includes based on determining that the transaction is a conventional transaction, forwarding the transaction-data to a second data collector.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
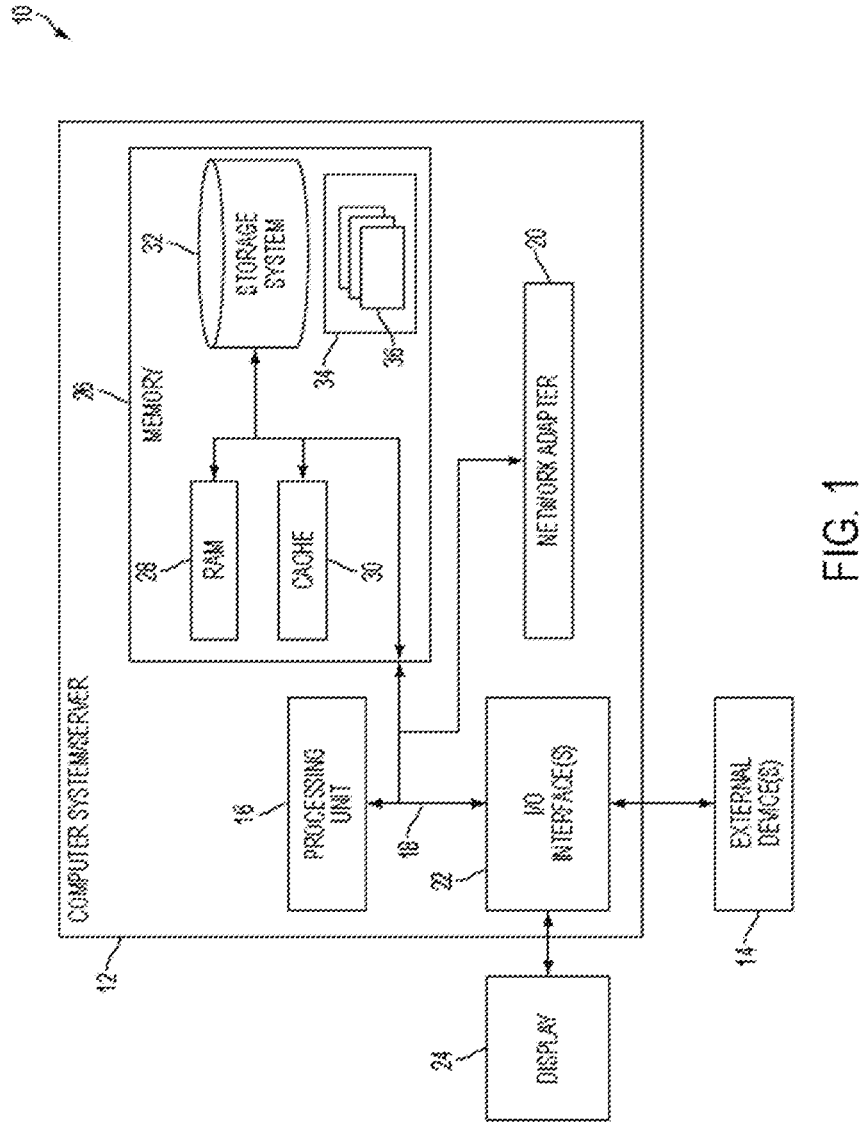
FIG. 1 depicts a cloud computing node according to one or more embodiments of the present invention.

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 26, and a bus 18 that couples various system components including system memory 26 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 26 can include computer system readable media in the form of volatile memory, such as random access memory (RAM) 28 and/or cache memory 30. Computer system/server 12 may further include other removable/non-removable, volatile/non-volatile computer system storage media. By way of example only, storage system 32 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 26 may include at least one program product having a set (e.g., at least one) of program modules that are configured to carry out the functions of embodiments of the invention.

Program/utility 34, having a set (at least one) of program modules 36, may be stored in memory 26 by way of example, and not limitation, as well as an operating system, one or more application programs, other program modules, and program data. Each of the operating system, one or more application programs, other program modules, and program data or some combination thereof may include an implementation of a networking environment. Program modules 36 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
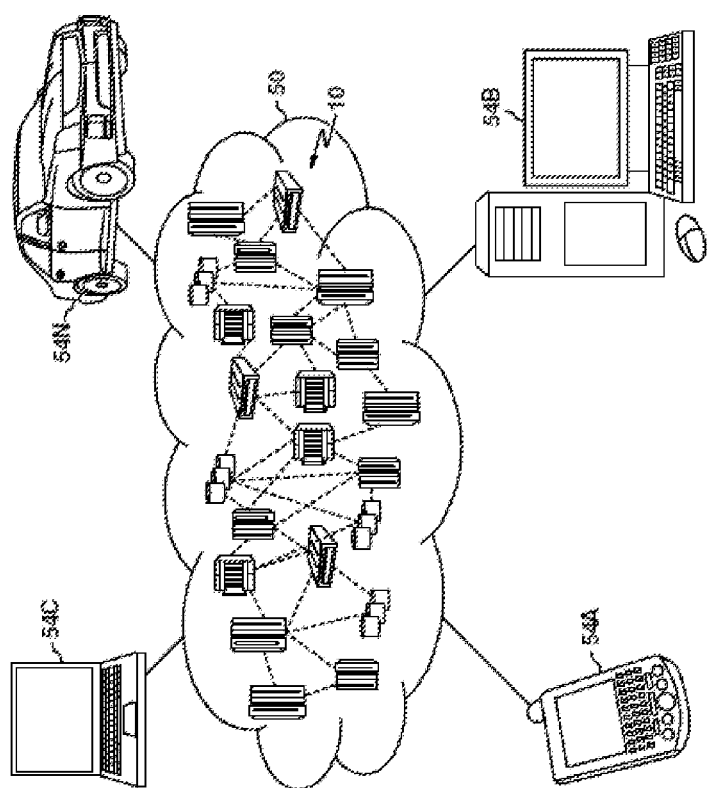
FIG. 2 depicts a cloud computing environment according to one or more embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
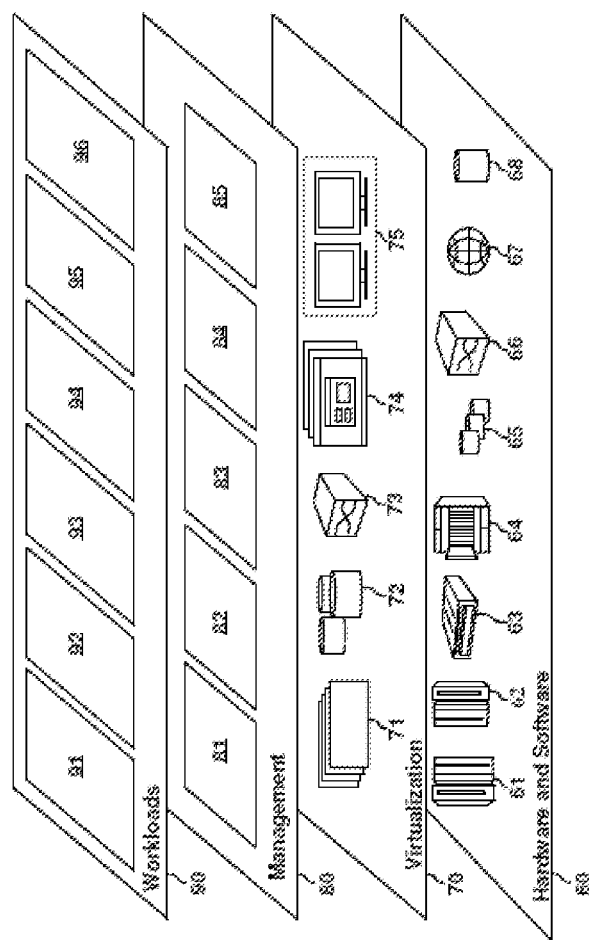
FIG. 3 depicts abstraction model layers according to one or more embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and monitoring and adjusting data collection 96, and the like.

As described earlier, monitoring of one or more usage metrics such as CPU cycles or other resources used, or the number of data items or bytes processed. Secondly, the ever-increasing need for consistently high performance of data processing systems necessitates efficient performance monitoring and analysis of one or more operations, transactions, or tasks that are being performed. For example, the operations can include online transactions like uploading/downloading/accessing an electronic file or record, streaming music, sending/receiving electronic messages, sending/receiving online payments, and various other such transactions. The operations can also include transactions such as storing files, caching data, creating/sending/receiving network packets, and other such events in a computing environment. It is understood that the above are just a few examples of transactions in a computing environment and that the technical solutions described herein are not limited only to the above examples, but any other type of transaction. In one or more examples, the transactions can contain data that provides one or more business insights.

A number of monitoring and debugging solutions have been proposed which involve adding instrumentation to a device performing the operations to be monitored or adding dedicated reporting nodes to the computing network. However, these solutions are typically unsuitable for systems such as a production environment, an enterprise system, a cloud computing system, etc. because the additional processing of the monitoring tasks impacts the overall performance of the system and/or distorts the operational flow. In many cases, a decision to implement operational data monitoring requires the deployment of modified application code in which the monitoring has been enabled. Furthermore, many of the available solutions fail to allow performance monitoring of individual data processing components within the scope of a single application program execution.

Further, typically, users want to monitor or want to know about 'deviant' transactions, which are transactions that do not occur according to a predetermined protocol, or in which one or more predetermined conditions are not met. The users, particularly organizations that providing infrastructure for performing the transactions, are more interested to know about the deviant transactions than 'conventional' transactions, which occur as per protocol. In these cases, knowing more about a deviant transaction can include identifying a cause of the deviant transaction, determining one or more parameters associated with the deviant transaction, and other such data that can facilitate improving the performance of the system that performed the deviant transaction.

In most cases, the monitoring tools described earlier would collect information for all the transactions, conventional and deviant transactions, and then generate alerts or events according to one or more thresholds that identify the deviant transactions being performed. In one or more examples, the thresholds are set by one or more users. The threshold identifies the deviant transactions. In this way, monitoring tools have to collect all the transaction-data for each transaction and compare the transaction-data of each transaction with the threshold(s) before they can generate any alerts or events to notify about the deviant transaction.

There are several technical challenges in the existing solutions that monitor all of the transaction-data to identify the deviant transaction. For example, during a peak time, when a transaction rate of the cloud system is very high, the user desires that the system resource be allocated to the performance of the transactions rather than the monitoring tools. However, existing solutions cannot allow such optimal usage of the resources because one, typically most of the deviant transactions are generated during the peak time, and second, the user desires to have the detailed data of the deviant transactions to be collected for debugging the cause of the deviant transactions. Further, in case of cloud systems where the use of system resources varies according to a usage rate, it is expensive to collect all the transactions' data during the peak time and the contention of a system resource in the peak time makes it even more expensive to do this.

Further, although the user uses (and can only use) the deviant transactions for debugging, typically, most (almost all) of the transaction-data that is collected is for conventional transactions because most transactions are conventional. Thus, using the system resources to collect all of the transaction-data is not an optimal use of the system resources.

In one or more examples, instead of collecting all the transaction-data a sampling rate is applied so that a subset of the transaction-data is collected and stored for analysis. However, a technical challenge with such sampling of the transaction-data is that the selected subset of transactions results in some deviant transactions also to be filtered. Accordingly, all of the deviant transactions may not be collected for debugging.

The technical solutions described herein address such technical challenges and facilitates reducing the amount of data collected by the monitoring system even during the peak time and further ensure that the detailed transaction-data is collected for all the deviant transactions. The monitoring system implemented using one or more embodiments of the present invention collects a complete transaction-data for the deviant transactions and collects a partial transaction-data for conventional transactions. Further, one or more embodiments of the present invention help provide a summarized data of all the transactions to the user, even though only a subset of the transaction-data is collected.

Figure 4:
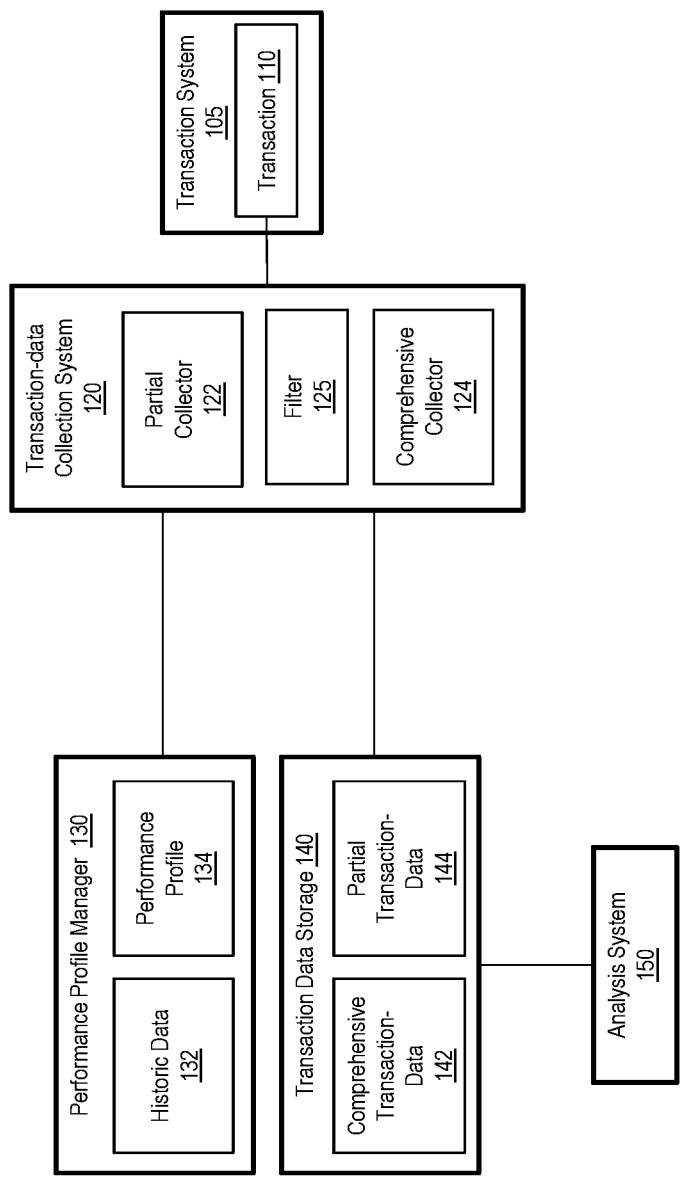
FIG. 4 depicts a transaction-data collection system 120 according to one or more embodiments of the present invention.

FIG. 4 depicts a transaction-data collection system 120 according to one or more embodiments of the present invention. The transaction-data collection system 120 includes, among other components, a filter 125, a partial collector 122, and a comprehensive collector 124. The transaction-data collection system 120 (referred to as collection system 120 hereafter) monitors each transaction 110 that is being performed by a transaction system 105. The transaction system 105 can be any system, such as a cloud computing system (FIG. 2), computer device (FIG. 1), or any other computing system. The filter 125 uses a performance profile 134 from a performance profile manager 130 to determine which of the two collectors, the comprehensive collector 124 and the partial collector 122, to use for collecting transaction-data for the transaction 110.

The performance profile manager 130 generates the performance profile 134 using machine learning algorithm and historic data 132 of previous transactions. The performance profile 134 is associated with a time-interval for which the collection system 120 monitors the transactions 110. A next time-interval has a separate second performance profile 134, and the collection system 120 uses that second performance profile 134 for the next time-interval. The duration of the time-interval can be predetermined and varied dynamically. For example, the time-interval can be 1 minute, 5 minutes, 30 minutes, or any other duration of time. The performance profile 134 is generated automatically using the historic data 132.

The filter 125, using the performance profile 134, determines which transaction 110 to send to the partial collector 122 and which transaction 110 to send to the comprehensive collector 124. The comprehensive collector 124 collects entire transaction-data for the transaction 110 while the partial collector 122 only collects a predetermined subset of the transaction-data for the transaction 110. This is because the filter 125 forwards the deviant transaction 110 that is identified based on the performance profile 134 to the comprehensive collector 124 and the conventional transaction 110 to the partial collector 122. Accordingly, the collection system 120 can improve in performance by spending resource to collect and store transaction-data only for the deviant transactions 110.

Further, the comprehensive collector 124 stores the detailed transaction-data of the deviant transaction 110 in a comprehensive transaction-data storage 142, while the partial collector 122 stores the subset of the transaction-data in a partial transaction-data storage 144. The comprehensive transaction-data storage 142 and the partial transaction-data storage 144 can be separate storage partitions of a single data storage system 140, in one or more examples. Alternatively, the comprehensive transaction-data storage 142 and the partial transaction-data storage 144 can be separate storage systems.

Separating the storage of the transaction-data in this manner facilitates an analysis system 150 to analyze and debug the transaction-data for the deviant transactions 110 in an easier manner. For example, the analysis system 150 can generate and forward separate statistic queries to the separate storages 142 and 144 based on whether the conventional transactions or deviant transactions are being analyzed. For example, for an analysis query, such as a statistic query, that is based on all the transaction from the monitored time-interval, the query can be of type select <condition> from partial-data-store & comprehensive-data-store. Whereas, in the case of an analysis query based only on deviant transactions, the query can be of type select <condition> from comprehensive-data-store. Further yet, in case of an analysis query based only on conventional transactions, the query can be of type select <condition> from partial-data-store.

There are multiple ways to separate the transaction-data stored corresponding to conventional and deviant events. For example, the partial transaction-data storage 144 and the comprehensive transaction-data storage 142 can be different data storage files, different tables in a database, same data store (table/file) with the different suffix or prefix, and the like.

It should be noted that although one or more components are depicted using separate blocks in FIG. 4, in one or more examples, the components may be part of a single system.

Figure 5:
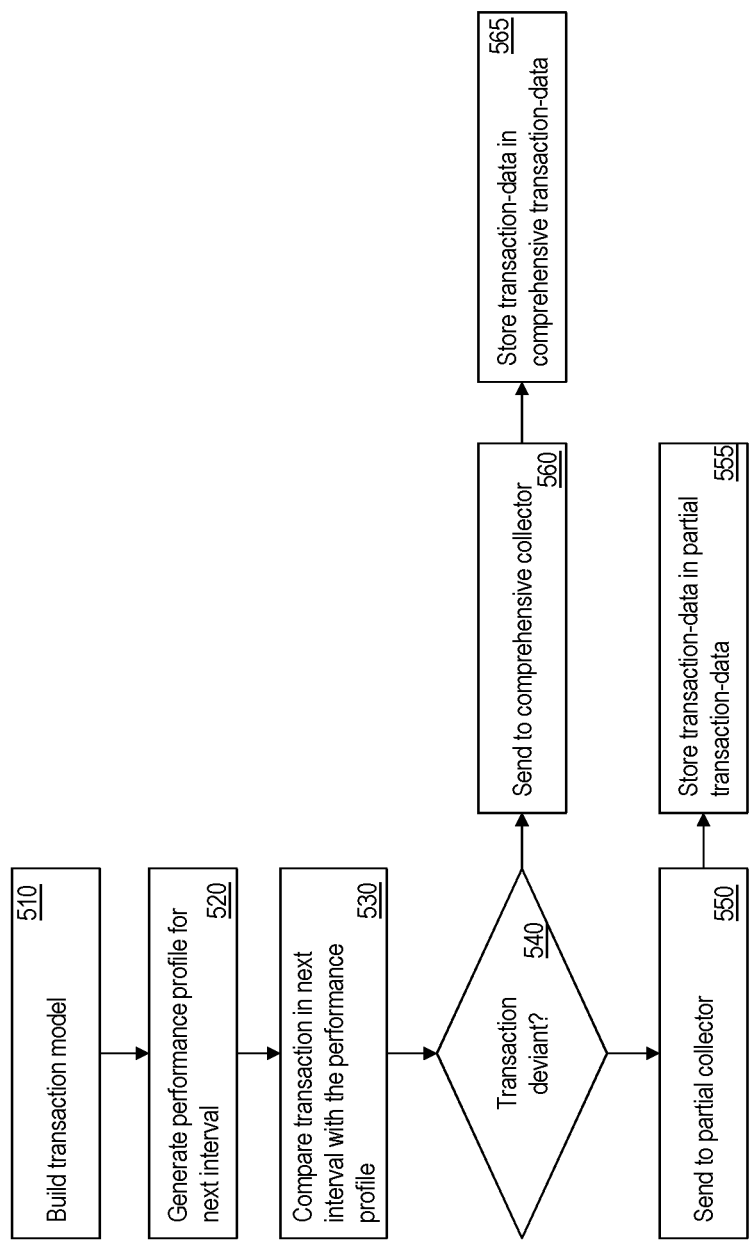
FIG. 5 depicts a flowchart of a method for cognitive monitoring of data collection in real time according to one or more embodiments of the present invention.

FIG. 5 depicts a flowchart of a method for cognitive monitoring of data collection in real time according to one or more embodiments of the present invention. The method can be implemented by the collection system 120. The method includes determining, automatically, a model for the transactions being performed by the transaction system, at 510. In one or more examples, a model is generated for each transaction. The model identifies performance indicators, factors, or parameters that determine whether the transaction is deviant. The model is generated and refined continuously using machine learning. At the outset, the model is created using the historic data 132 of the previous transactions that have been performed.

According to one or more embodiments of the present invention, the model is considered as a vector $\vec{x}$ of the key indicators, and an average of the model can be calculated as:

$$\bar{\vec{x}} = \sum_{i=1}^{n} \frac{\vec{x}_i}{n},$$

where n is the number of key indicators.

The method further includes generating the performance profile 134 for the next incoming time-interval of transactions 110 from the transaction system 105 based on the history data 132 and the model, at 520. The performance profile 134 provides a metric using the key indicators to determine if the transaction 110 is deviant. The performance profile 134 is associated with the next incoming time-interval of transactions, which can be a predetermined duration. The performance profile 134 can be based on the performance profile of the same time-interval (for example, between 1 PM-3 PM) over a predetermined number of previous days. Alternatively, or in addition, the performance profile 134 can be based on the performance profile of previous time-intervals of the same day. For example, the performance profile 134 of the time-interval 1 PM-3 PM can be based on performance profiles of the time-intervals 7 AM-9 AM, 9 AM-11 AM, and 11 AM-1 PM. It is understood that the above examples can be varied in different embodiments.

For example, the performance profile 134 for the upcoming time-interval is calculated as:

$$\hat{P} = k \sum_{i=1}^{n} (1-\lambda)\lambda^i P'_{n-i} + (1-k) \sum_{i=1}^{m} (1-\theta)\theta^i P_{m-i}$$

$$\lambda, \theta, k \in (0, 1)$$

Here P' refers to the performance profile of the same time-interval in the previous n days, P here refers to the profile of last m intervals in the present day which includes the upcoming time-interval. The factors $\lambda, \theta, k \in (0,1)$, which are be used for generating the performance profile 134 for next coming interval, are computed based on training a machine learning algorithm using the historic data 132. In one or more examples, each transaction has a certain set of factors $\lambda, \theta, k \in (0,1)$.

The method further includes comparing the transaction 110 from the next time-interval with the performance profile 134 by the filter 125, at 530. Based on the comparison the transaction 110 can be identified as deviant (or conventional), at 540. The comparison is performed by computing the metric $\text{Dist}(\vec{x}, \bar{\vec{x}}) = \sqrt{(\vec{x}-\bar{\vec{x}})^T S^{-1}(\vec{x}-\bar{\vec{x}})}$ to measure if the transaction 110 is deviant or not, where S refers to the covariance matrix. Here, $\vec{x}$ is the vector of the key indicators of the transaction 110 and $\bar{\vec{x}}$ is the average of the key indicators of the transactions that have already been performed in the time-interval being examined. The Dist is compared with the performance profile 134 to determine if the transaction 110 is deviant, at 540. In one or more examples, the transaction 110 is deemed deviant if the Dist is larger than (or equal to) the performance profile 134.

If the transaction 110 is deemed to be deviant, the transaction 110 is forwarded to the comprehensive collector 124, at 560. The comprehensive collector 124 collects and stores all of the transaction-data for the transaction 110 in the comprehensive transaction-data storage 142, at 565. If the transaction 110 is deemed to be conventional, the transaction 110 is forward to the partial collector 122, at 550. The partial collector 122 collects and stores only a predetermined subset of the transaction-data for the transaction 110 in the partial transaction-data storage 144, at 555.

The method accordingly facilitates collecting and storing comprehensive (or all) transaction-data for the deviant transactions only, while collecting part of the transaction-data for conventional transactions. The performance of the cloud computing system is improved as fewer resources are used for collecting and storing the transaction-data. Further, the filtered data for the deviant transactions stored in the separate partial transaction-data storage 144 can be accessed more readily for problem debugging, compared to the transaction-data for all transactions being stored together (in existing solutions).

An example of generating the performance profile 134 and the model which can be used to generate the performance profile 134 are now provided for explanation. It is understood that the further description is just one example scenario and that one or more embodiments of the present invention are applicable in various other example scenarios other than the described.

In the example, consider that the CPU TIME and ELAPSE TIME are the key indicators to determine whether the transaction 110 is deviant. CPU TIME refers to the duration for which a processing unit of the transaction system 105 is used for completing the transaction 110, and ELAPSE TIME refers to an amount of time required for completing the transaction 110. In this case, $\vec{x}=(x_1, x_2)$, where $x_1$ refers to the CPU TIME and $x_2$ refers to the ELAPSE TIME.

Further, consider that the transaction rate is 100 in the interval being monitored, then, $$\bar{\vec{x}} = \sum_{i=1}^{100} \frac{\vec{x}_i}{n}.$$

If the desired sampling rate provided by the user is 10%, the collection system 120, by the calculation of $\text{Dist}(\vec{x}, \bar{\vec{x}}) = \sqrt{(\vec{x}-\bar{\vec{x}})^T S^{-1}(\vec{x}-\bar{\vec{x}})}$, determines an 'edge value' (e), which achieves that the number of $\vec{x}$ which $\text{Dist}(\vec{x}, \bar{\vec{x}}) > e$ is 10% of total $\vec{x}$. The performance profile can then be expressed as $P(\vec{x}, e)$. In one or more examples, the value for the edge can be configured by the user via the analysis system 150, or any other manner.

Further, the example describes how to train the model for performance profile generation. The model is built using machine learning with the input of the historic data 132 for training, to determine values of the variable set $\lambda$, $\theta$, k. Any known machine learning techniques, such as logistic regression, back propagation neural network, apriori algorithm, k-means, regression, and the like, can be used for determining the variable set. For the ongoing example, consider that the values are as follows.

$\lambda=0.23$
$\theta=0.38$
k=0.29

Using these values in the above described performance profile computation:

$$\hat{P}(\bar{\vec{x}}, e) = 0.29 \sum_{i=1}^{4}(1-\lambda)\lambda^i P'_{n-i} + 0.71 \sum_{i=1}^{6}(1-\theta)\theta^i P_{m-i}$$

In these calculations, note that $(1-\lambda)\lambda^5<0.001$ and $(1-\theta)\theta^7<0.001$. The performance profile 134 and the edge are calculated before the start of the upcoming time-interval that is to be monitored. Then, using the $\hat{P}(\vec{x}, e)$ performance profile 134, each transaction 110 in the time-interval is filtered to determine if the transaction 110 is deviant. For example, for the transaction 110, when $\text{Dist}(\vec{x}, \bar{\vec{x}}) > e$, the transaction is sent to the comprehensive collector 124, and instead, when $\text{Dist}(\vec{x}, \bar{\vec{x}}) \leq e$, the transaction 110 is filtered and forwarded to the partial collector 122.

Figure 6:
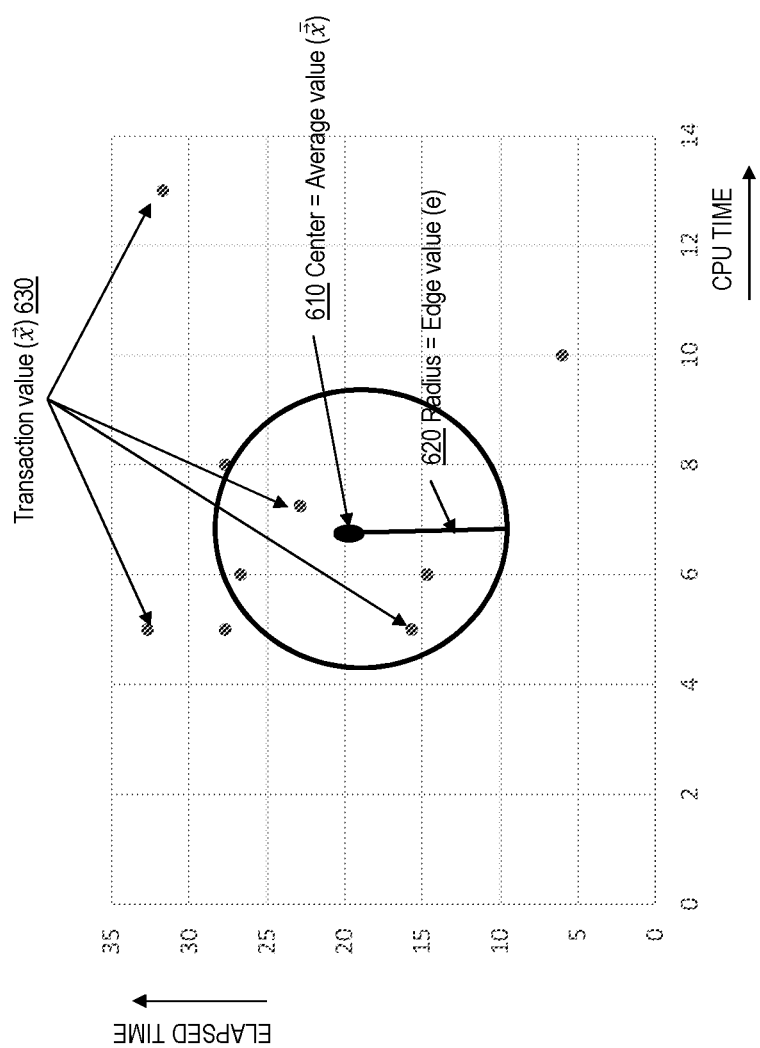
FIG. 6 provides a visual depiction of the above example according to one or more embodiments of the present invention.

FIG. 6 provides a visual depiction of the above example according to one or more embodiments of the present invention. Here, because there are 2 key indicators (CPU TIME and ELAPSE TIME) in the performance profile 134, the depiction takes form of a 2D plot. In other examples, where a different number of key indicators is used, the plot can have a different dimension. In FIG. 6, the average $\bar{\vec{x}}$ is a center (610) of a circle, where the radius (620) of the circle is the edge value e. Further, record points (630) represent transactions in the time-interval being monitored. In this case, the record points (630) which lie in the circle represent conventional transactions, and the record points (630) outside the circle represent the deviant transactions. In this case, only those 3 transactions are deviant, and need comprehensive information to be collected. Only partial transaction-data is collected for the transactions represented by the record points (630) inside the circle. Accordingly, system resources spent collecting transaction-data are reduced.

Referring to the flowchart of FIG. 5, generating the performance profile 134 is now described in further detail for one or more embodiments of the present invention. The performance profile 134 for a certain time-interval m in a day n, the performance profile is generated to be substantially similar to the $m^{th}$ time-interval of previous days n-1, n-2, . . . . Further, the performance profile 134 is adjusted according to time-intervals m-1, m-2, . . . of the $n^{th}$ day itself. Accordingly, generating the performance profile 134 includes generating a first sub-model:

$$P_n(\bar{\vec{x}}_n, e) = \sum_{i=1}^{n}(1-\lambda)\lambda^i(\bar{\vec{x}}'_{n-i}, e'_{n-i}) = \sum_{i=1}^{n}(1-\lambda)\lambda^i P'_{n-i}$$

and generating a second sub-model:

$$P_m(\bar{\vec{x}}_m, e) = \sum_{i=1}^{m}(1-\theta)\theta^i(\bar{\vec{x}}_{m-i}, e_{m-i}) = \sum_{i=1}^{m}(1-\theta)\theta^i P_{m-i}$$

Here, $\lambda$, $\theta$ are predetermined values determined using machine learning, and which have values from 0 to 1, P' refers to the performance profile of same time-interval in the prior days, and P refers to the performance profile of prior time-intervals in the same (nth) day. Further, the sub-models are restricted $\forall y \in (0,1)$, $$\lim_{n\to\infty} \sum_{i=1}^{n}(1-y)y^i = 1,$$

so that the final value of the performance profile 134 does not overflow the range [0, 1]. Accordingly, the performance profile 134 uses the factor k and takes the form:

$$\hat{P} = k\sum_{i=1}^{n}(1-\lambda)\lambda^i P'_{n-i} + (1-k)\sum_{i=1}^{m}(1-\theta)\theta^i P_{m-i}$$

$\lambda, \theta, k \in (0, 1)$

Determining the values for the factors $\lambda$, $\theta$ and k by the machine learning technique is further performed for generating the performance profile 134. It should be noted that computing the performance profile 134 using the performance profiles for the previous days and previous time-intervals can be performed using the historic data 132. This is because the performance profiles are also stored in the historic data 132 to assist in this calculation. Accordingly, for a certain time-interval m in day n, the historic data 132 includes the performance profile data of the $m^{th}$ time-interval in the days n−1, n−2, . . . , and for the time-intervals m−1, m−2, . . . in the same ($n^{th}$) day. To compute the estimated performance profile $\hat{P}$ for the upcoming time-interval, a joint vector $\beta(k(1-k(1-\lambda)\lambda, \ldots k(1-\lambda)\lambda^n, (1-k)(1-v)\theta, \ldots, (1-k)(1-\theta)\theta^m)$ is used such that:

$$\hat{P} = \beta \begin{bmatrix} P'_n \\ P_m \end{bmatrix}$$

Figure 7:
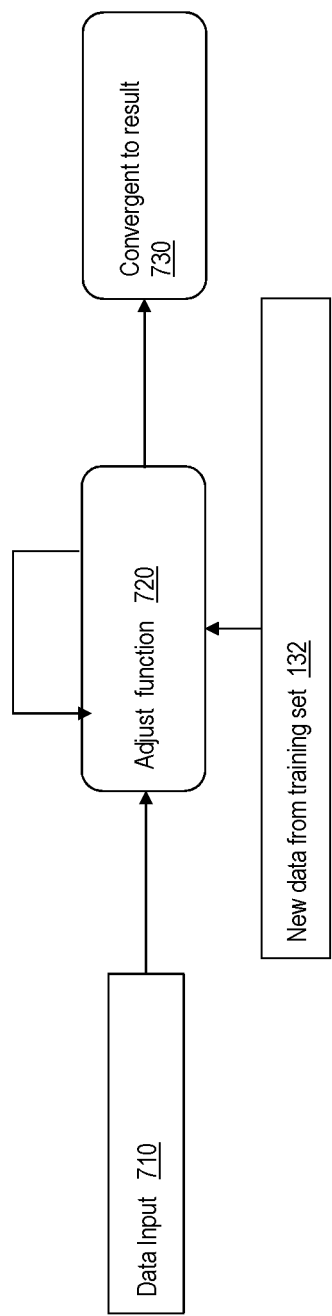
FIG. 7 depicts a flowchart of computing the factors using the machine learning algorithm according to one or more embodiments of the present invention.

FIG. 7 depicts a flowchart of computing the factors using the machine learning algorithm according to one or more embodiments of the present invention. For computing the factors $\lambda$, $\theta$ and k, the machine learning algorithm is setup to use a loss function $$L(\beta) = \frac{1}{2}\left(P - \beta\begin{bmatrix} P'_n \\ P_m \end{bmatrix}\right)^2$$

with a goal to have a min $L(\beta)$. To determine the values of the factors to meet the goal, generally, the partial derivative for each $\beta_i$ is computed. However, there is a relationship between $\beta_i$, such that:

when $i \leq n, \beta_i = k\lambda^{i-1}\beta_1$; and when $n < i \leq n+m, \beta_i = k\theta^{i-1}\beta_{n+1}$ In this case, there are only 3 directions for the gradient change, so instead of computing partial derivative for each $\beta_i$ for the data, only the partial derivative for $\lambda$, $\theta$, k can be made for the first order formula of loss function as:

$L(\beta) = \frac{1}{2}(P-k(1-\lambda)\lambda P'_{n-1}-(1-k)(1-\theta)\theta P_{m-1})^2$ Accordingly, the method includes inputting data for the first order formula above and initial seed values for the factors $\lambda$, $\theta$, k, at 710. The method further includes an adjust function, at 720 that computes:

$$\nabla_\beta L(\beta) = \begin{bmatrix} \frac{\partial^2 L}{\partial \lambda^2} \\ \frac{\partial^2 L}{\partial \theta^2} \\ \frac{\partial L}{\partial k} \end{bmatrix}$$

The factors $\lambda$, $\theta$, k are adjusted so that:

$$\begin{bmatrix} \lambda \\ \theta \\ k \end{bmatrix}_1 = \begin{bmatrix} \lambda \\ \theta \\ k \end{bmatrix} - \alpha \nabla_\beta L(\beta)$$

Here, $\alpha$ is a predetermined step value for the machine learning technique being used to achieve:

$$0 < \alpha < 2\left(\left|(P'_{n-1}, P_{m-1})\begin{pmatrix} P'_{n-1} \\ P_{m-1} \end{pmatrix}\right|\right)^{-1}.$$

The adjustments are performed until the calculated results are convergent for the training data used for the machine learning algorithm, at 730. The training data used is the historic data 132 of prior transactions in one or more examples.

When performing the calculations if for any factor p from the factors $\lambda$, $\theta$, k, the value of $(1-p)p^i < 0.01$, the effect of the calculation is considered insubstantial (minor) and accordingly, to prevent further usage of the system resources, calculation of the performance profile is not performed. Accordingly, the performance profile 134 can be expressed as:

$\hat{P}(\vec{x}, e) = k\Sigma_{i=1}^{n}(1-\lambda)\lambda^i P'_{n-i} + (1-k)\Sigma_{i=1}^{m}(1-\theta)\theta^i P_{m-i}$,
where $(1-\theta)\theta^i > 0.001$ & $(1-\lambda)\lambda^i > 0.001$.

The above calculation is performed for each transaction 110 from the upcoming time-interval and used as a filter to determine conventional/deviant transaction using the Dist metric from the average. When $\text{Dist}(\vec{x}, \vec{x}) > e$, the transaction 110 is deemed deviant and comprehensive collector 124 is invoked, and when $\text{Dist}(\vec{x}, \vec{x}) \leq e$, the transaction 110 is filtered out and partial transaction-data is stored. In one or more examples, the partial transaction-data includes only a predetermined fields of transaction-data, substantially lesser data, compared to the comprehensive transaction-data stored in case of deviant transaction. In one or more examples, the partial transaction-data includes only the key indicator values being stored.

It should be noted that the monitored time-interval m can be any time-interval during a day, and the examples provided herein are just few possibilities. In one or more examples, the monitored time-interval is the duration of the peak time during which the transaction system 105 experiences the highest volume of transactions in a day.

Further, it should be noted that the performance profile 134 is generated specific to the time-interval and to the transaction system 105 based on the historic data 132 of the prior transactions performed by the transaction system 105. In one or more examples, the collection system 120 can monitor a second time for a second transaction system 105 by generating a second performance profile 134 for the peak time of the second transaction system 105. This is because the performance profiles are identified by the machine learning using the historic data and live updated transaction-data during the monitored interval, which makes the collection system 120 to be more flexible and accurate for each transaction system being monitored. Accordingly, the collection system 120 can be customized for different users associated with the separate transaction systems being monitored and debugged using the transaction-data being acquired by the collection system 120.

The separate storage of the comprehensive transaction-data and the partial transaction-data facilitates the analysis system 150 to generate and provide dynamic queries to access different statistics from the different types of transaction-data. For example, for queries regarding a general trend of all transaction-data a query can be directed to both storages. An analysis of only the deviant data can be performed by accessing the comprehensive transaction-data only, without having to filter through the transaction-data for conventional transactions.

Accordingly, one or more embodiments of the present invention save the system costs and resources, especially in the peak hours, used for acquiring transaction-data without losing a key transaction which a user may be concerned about.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by one or more processors, a transaction-data for a transaction that occurs in a particular time-interval;
   at runtime, comparing, by the one or more processors, a set of parameters from the transaction-data with a performance profile associated specifically with the particular time-interval, the performance profile for the particular time-interval is generated using machine learning based on one or more machine learning parameters, a performance profile of same time-interval as the particular time-interval from a prior day, and a performance profile associated with another time-interval from the same day as the particular time-interval;
   at runtime, based on determining that the transaction is a deviant transaction, forwarding, by the one or more processors, the transaction-data to a comprehensive data collector; and
   at runtime, based on determining that the transaction is a conventional transaction, forwarding, by the one or more processors, the transaction-data to a partial data collector.

2. The computer-implemented method of claim 1, wherein the comprehensive data collector stores the transaction-data to a first data storage.

3. The computer-implemented method of claim 2, wherein the second data collector stores a subset of the transaction-data to a partial data storage.

4. The computer-implemented method of claim 1, further comprising generating the performance profile associated with the particular time-interval based on a performance profile associated with a time-interval from the same day as the particular time-interval.

5. A system comprising:
   a transaction system; and
   a data collection system configured to acquire, in real time, transaction-data for a plurality of transactions being performed by the transaction system, acquiring the transaction-data in real time comprises:
      receiving a transaction-data for a transaction that occurs in a particular time-interval;
      comparing a set of parameters from the transaction-data with a performance profile associated specifically with the particular time-interval, the performance profile for the particular time-interval is generated using machine learning based on one or more machine learning parameters, a performance profile of same time-interval as the particular time-interval from a prior day, and a performance profile associated with another time-interval from the same day as the particular time-interval;
      based on determining that the transaction is a deviant transaction, forwarding the transaction-data to a comprehensive data collector; and
      based on determining that the transaction is a conventional transaction, forwarding the transaction-data to a partial data collector.

6. The system of claim 5, wherein the comprehensive data collector stores the transaction-data to a first data storage.

7. The system of claim 6, wherein the second data collector stores a subset of the transaction-data to a partial data storage.

8. The system of claim 5, wherein acquiring the transaction-data further comprises generating the performance profile associated with the particular time-interval based on a performance profile associated with a time-interval from the same day as the particular time-interval.

9. A computer program product comprising a computer readable storage medium having stored thereon program instructions executable by one or more processing devices to perform a method comprising:
   receiving a transaction-data for a transaction that occurs in a particular time-interval;
   comparing a set of parameters from the transaction-data with a performance profile associated specifically with the particular time-interval, the performance profile for the particular time-interval is generated using machine learning based on one or more machine learning parameters, a performance profile of same time-interval as the particular time-interval from a prior day, and a performance profile associated with another time-interval from the same day as the particular time-interval;
   based on determining that the transaction is a deviant transaction, forwarding the transaction-data to a comprehensive data collector; and
   based on determining that the transaction is a conventional transaction, forwarding the transaction-data to a partial data collector.

10. The computer program product of claim 9, wherein the comprehensive data collector stores the transaction-data to a first data storage.

11. The computer program product of claim 10, wherein the partial data collector stores a subset of the transaction-data to a second data storage.

* * * * *